(12) United States Patent
Cho (10) Patent No.: US 9,100,916 B2
(45) Date of Patent: Aug. 4, 2015

(54) APPARATUS AND METHOD FOR SAVING POWER IN PORTABLE TERMINAL

(71) Applicant: Samsung Electronics Co. Ltd., Suwon-si, Gyeonggi-do (KR)

(72) Inventor: Seong-Ho Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 349 days.

(21) Appl. No.: 13/664,570

(22) Filed: Oct. 31, 2012

(65) Prior Publication Data
US 2013/0124894 A1 May 16, 2013

(30) Foreign Application Priority Data
Nov. 14, 2011 (KR) .................. 10-2011-0118229

(51) Int. Cl.
G06F 1/32 (2006.01)
H04W 52/02 (2009.01)

(52) U.S. Cl.
CPC ......... *H04W 52/0229* (2013.01); *G06F 1/3278* (2013.01); *Y02B 60/50* (2013.01)

(58) Field of Classification Search
None
See application file for complete search history.

(56) References Cited

U.S. PATENT DOCUMENTS

| 8,391,260 B1* | 3/2013 | Kopikare et al. | 370/338 |
| 2010/0325459 A1* | 12/2010 | Kangude et al. | 713/323 |
| 2012/0195227 A1* | 8/2012 | Vedantham et al. | 370/253 |

* cited by examiner

*Primary Examiner* — Paul Yanchus, III
(74) *Attorney, Agent, or Firm* — Jefferson IP Law, LLP (57) ABSTRACT

A portable terminal for providing a Wi-Fi Peer-to-Peer (P2P) function is provided. An apparatus and a method of a portable terminal for enhancing a data transmission performance by adjusting a Notice of Absence (NoA) duration in a NoA-based power saving mode are provided. The apparatus includes a communication unit for receiving Notice of Absence (NoA) information for a power saving mode, a control unit for controlling a client of a group to enter the power saving mode based on the NoA information, and a power management unit for generating the NoA information for the power saving mode.

20 Claims, 4 Drawing Sheets

APPARATUS AND METHOD FOR SAVING POWER IN PORTABLE TERMINAL

PRIORITY

This application claims the benefit under 35 U.S.C. §119 (a) of a Korean patent application filed in the Korean Intellectual Property Office on Nov. 14, 2011, and assigned Serial No. 10-2011-0118229, the entire disclosure of which is hereby incorporated by reference.

BACKGROUND OF THE INVENTION

1. Field of the Invention

The present invention relates to a portable terminal for providing a Wi-Fi Peer-to-Peer (P2P) function. More particularly, the present invention relates to an apparatus and a method for enhancing a data transmission performance in a power saving mode of a portable terminal.

2. Description of the Related Art

Portable terminals allowing wireless voice communication and information exchange are rapidly becoming necessities of modern life. Early portable terminals merely allowed wireless communication. As portable terminal technologies advanced and wireless Internet was adopted, applications of the portable terminal expanded from the simple phone call or schedule management to include games, remote control using short-range communication, image capturing using an embedded digital camera, and a wireless Local Area Network (LAN) function.

The wireless LAN function provides a communication service such as Internet to the portable terminal (e.g., PDA, notebook computer, etc.) traveling within a certain distance based on an installed Access Point (AP), which is a wireless access device. The initial propagation distance of the wireless LAN was merely 10 m and over the years expanded to hundreds of meters. A transmission rate of the wireless LAN is also improved to transmit and receive mass multimedia.

Recently, Wi-Fi Direct technology has been developed to allow Wi-Fi devices to freely communicate with each other for printing or content sharing with no need for the AP or a router. The Wi-Fi Direct technology may organize a group with a Peer-to-Peer (P2P) group owner and a P2P client using Wi-Fi P2P.

For mobility, the portable terminal uses a rechargeable battery attachable to the portable terminal, as a power supply means. As a result, the portable terminal typically operates with the limited battery capacity.

Accordingly, the portable terminals in the Wi-Fi P2P save their power in a power saving mode. The terminal may enter the power saving mode based on opportunistic power save. When the P2P group owner has no packet to transmit, the P2P client in the group notifies no transmit data and requests data transmission to the P2P clients in the group. Thus, with no data to transmit, the P2P group owner and the P2P client sleep and save power. The power saving mode based on the opportunistic power save reduces power consumption by entering a sleep mode when the device in the group is sleeping.

The terminals may enter the power saving mode based on Notice of Absence (NoA). A beacon transmitted by the P2P group owner delivers NoA information to the P2P client of the group, and the group member enters the sleep mode according to the NoA information. The NoA information includes a sleep start time, a sleep duration, a sleep counter, and a sleep interval. In the NoA based power saving mode, the P2P group owner which controls the group saves the power by prearranging the sleep point.

However, the NoA based power saving mode periodically enters the sleep mode so as to shorten the data transmission time as the sleep mode time increases. As a result, the power may be saved and the data transmission performance may be improved by reducing the sleep mode time. However, a method for setting the sleep duration and interval of the NoA information in the portable terminal is not defined yet. Accordingly, what is needed is an apparatus and a method for enhancing the data transmission performance by adjusting the sleep duration and interval of the NoA information in the portable terminal.

SUMMARY OF THE INVENTION

Aspects of the present invention are to address at least the above-mentioned problems and/or disadvantages and to provide at least the advantages described below. Accordingly, an aspect of the present invention to provide an apparatus and a method for enhancing data transmission performance in a portable terminal.

Another aspect of the present invention is to provide an apparatus and a method for adjusting a sleep duration of a Target Beacon Transmission Time (TBTT) section in a portable terminal.

Another aspect of the present invention is to provide an apparatus and a method for adjusting NoA information using packet transmission reception rates and a packet transmission speed of a client in a portable terminal.

In accordance with an aspect of the present invention, an apparatus for saving power in a portable terminal is provided. The apparatus includes a communication unit for receiving Notice of Absence (NoA) information for a power saving mode, a control unit for controlling a client of a group to enter the power saving mode based on the NoA information, and a power management unit for generating the NoA information for the power saving mode. The power management unit includes a time calculator for calculating a minimum time for data to transmit over a certain time, a transmission section calculator for calculating a data transmission section over the certain time, and a NoA setter for determining whether to change the NoA information by comparing the minimum time and the data transmission section, and for adjusting a sleep duration of the NoA information when the NoA information needs to change.

In accordance with another aspect of the present invention, a method for saving power in a portable terminal is provided. The method includes calculating a minimum time for data to transmit over a certain time, calculating a data transmission section over the certain time, determining whether to change NoA information by comparing the minimum time and the data transmission section, and when the NoA information needs to change, adjusting a sleep duration of the NoA information.

In accordance with another aspect of the present invention, an electronic device is provided. The device includes one or more processors, a memory, and at least one module stored in the memory and configured to be executed by the one or more processors. The at least one module calculates a minimum time for data to transmit over a certain time, calculates a data transmission section over the certain time, determines whether to change NoA information by comparing the minimum time and the data transmission section, and adjusts a sleep duration of the NoA information when the NoA information needs to change.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF THE INVENTION

The following description with reference to the accompanying drawings is provided to assist in a comprehensive understanding of exemplary embodiments of the invention as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention is provided for illustration purposes only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The present invention relates to an apparatus and a method of a portable terminal for enhancing a data transmission performance by adjusting a Notice of Absence (NoA) duration in a NoA based power saving mode.

Exemplary embodiments of the present invention provide a portable terminal for enhancing data transmission performance and saving power by adjusting a sleep duration of a Target Beacon Transmission Time (TBTT) section. The portable terminal may be a portable electronic devices such as a mobile phone, a media player, a tablet computer, a handheld computer, or a Personal Digital Assistant (PDA). Alternatively, the portable terminal may combine two or more functions of those devices.

Figure 1:
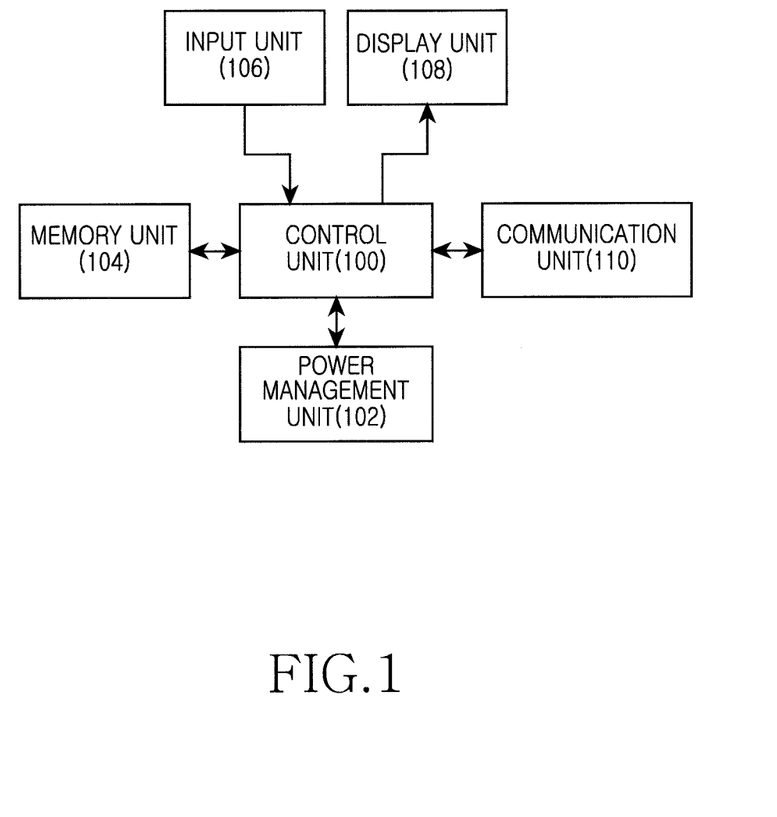
FIG. 1 is a block diagram of a portable terminal in a power saving mode according to an exemplary embodiment of the present invention.

FIG. 1 is a block diagram of a portable terminal in a power saving mode according to an exemplary embodiment of the present invention.

Referring to FIG. 1, the portable terminal includes a control unit 100, a power management unit 102, a memory unit 104, an input unit 106, a display unit 108, and a communication unit 110.

The control unit 100 of the portable terminal controls operations of the portable terminal. For example, the control unit 100 processes and controls voice communication and data communication. In addition to those typical functions, the control unit 100 processes a power saving mode based on Notice of Absence (NoA).

The control unit 100 processes to adjust the NoA duration using a data transmission rate to a client (the transmission rate of an uplink packet), a packet reception rate from the client (the reception orate of a downlink packet), and an average transmission speed of the client during a certain time W.

The power management unit 102 generates NoA information under the control of the control unit 100. The power management unit 102 adjusts a sleep duration of the NoA information. The power management unit 102 sets the sleep duration of the portable terminal by comparing a time needed to transmit data and a data transmission section.

For example, when the time for the data transmission is greater than the data transmission section, the power management unit 102 determines that the sleep duration is longer than the data transmission section and shortens the sleep duration of the current NoA to increase the data transmission section. When the data transmission time is smaller than the data transmission section, the power management unit 102 determines that the sleep duration is short enough to transmit the data over a preset data transmission section and processes to reduce the power by extending the sleep duration of the current NoA or to maintain the sleep duration of the current NoA.

The operations of the control unit 100 and the power management unit 102 may be executed by a particular software module (instruction set) stored in the memory unit 104. The operations of the control unit 100 and the power management unit 102 may be carried out using software or hardware. The power management unit 102 may be a control unit. In addition, the control unit 100 may be a processor and the power management unit 102 may be another processor.

The memory unit 104 includes a Read Only Memory (ROM), a Random Access Memory (RAM), and a flash ROM. The ROM stores microcodes and reference data of a program for processing and controlling the control unit 100 and the power management unit 102.

The RAM, which is a working memory of the control unit 100, stores temporary data generating in the program execution. The flash ROM stores updatable data such as phone book, outgoing messages, and incoming messages.

The memory unit 104 stores the software module for operating the control unit 100 and the power management unit 102.

The input unit 106 includes a plurality of function keys such as number keys 0~9, menu key, cancel key, OK key, call key, end key, Internet access key, navigation keys (or direction buttons), and character input keys. The input unit 106 provides the control unit 100 with key input data corresponding to the key pressed by the user. The number and arrangement of the keys may vary according to the function and design of the portable terminal.

The display unit 108 displays status information, characters, videos, and still images generating in the operation of the portable terminal. The display unit 108 may employ a color Liquid Crystal Display (LCD), an Active Matrix Organic Light Emitting Diode (AMOLED), and the like. When the display unit 108 includes a touch input device and is applied to a touch-type portable terminal, the display unit 108 may be used as the input device.

The communication unit 110 processes to transmit and receive radio signals of input and output data via an antenna (not shown). For transmission, the communication unit 110 channel-encodes, spreads, Radio Frequency (RF)-processes, and transmits data. For reception, the communication unit 110 converts the received RF signal into a baseband signal and restores the data by de-spreading and channel-decoding the baseband signal. In addition, the communication unit 110 transmits the NoA information generated using the data transmission time and the data transmission section, to the client.

While the control unit 100 may function as the power management unit 102, they are separately illustrated here to distinguish various exemplary functions of the present invention, not to limit the scope of the invention. One skilled in the art should understand that various modifications can be made without departing from the spirit and scope of the invention. For example, the control unit 100 may process all of the functions of the power management unit 102.

Figure 2:
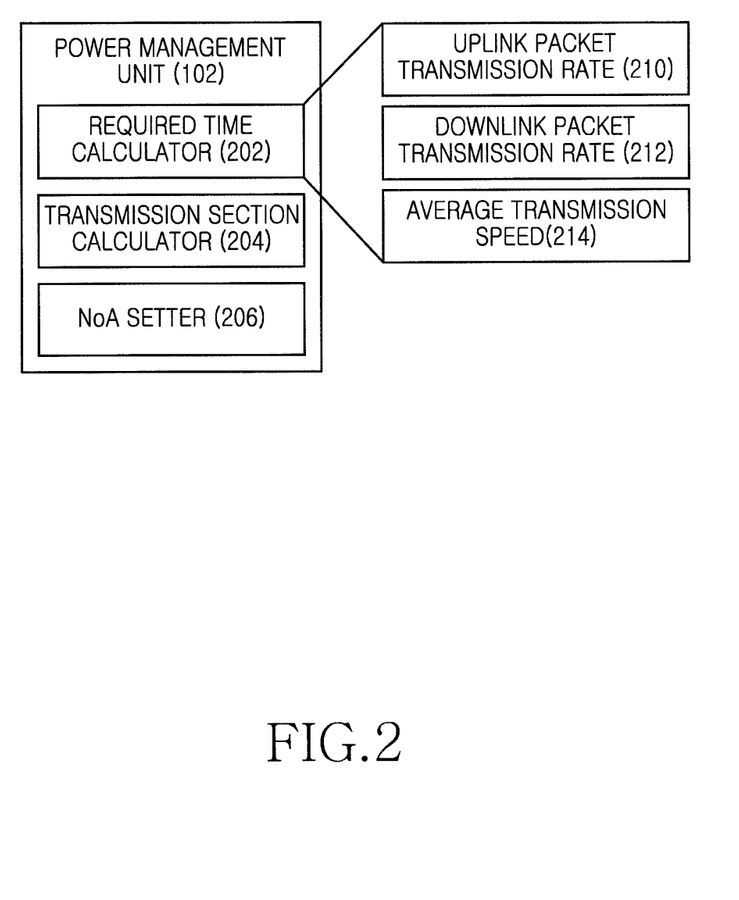
FIG. 2 is a block diagram of a power management unit according to an exemplary embodiment of the present invention.

FIG. 2 is a block diagram of the power management unit according to an exemplary embodiment of the present invention.

Referring to FIG. 2, in the power saving mode, the power management unit 102 processes to adjust the data transmission section using the data transmission time. The power management unit 102 includes a time calculator 202, a transmission section calculator 204, and a NoA setter 206.

The time calculator 202 of the power management unit 102 processes to calculate a minimum time for transmitting the data to the client. To calculate the minimum time, the time calculator 202 measures the data transmission rate ui 210 of the client (the transmission rate of the uplink packet) and the reception rate bi 212 of the client (the reception rate of the downlink packet). The time calculator 202 identifies the data transmission speed of the client, predicts an average transmission speed Ri 214 of the client during a certain time, and uses the average transmission speed Ri 214 to calculate the minimum time.

The time calculator 202 may calculate the minimum time for the data transmission by dividing the packet transmission and reception rates of the client by the packet transmission speed.

The transmission section calculator 204 of the power management unit 102 identifies the information in the current NoA. The information in the NoA includes the NoA start time, the sleep duration, the sleep counter, and the interval. The transmission section calculator 204 may identify the data transmission section using the sleep duration of the NoA information.

The TBTT section includes a NoA section, a data transmission section, and a NoA information reception section CTwindow. The client receives the NoA information in the NoA information reception section, enters the sleep mode in the NoA section, and wakes up to transmit and receive data in the data transmission section. The transmission section calculator 204 may calculate the data transmission section by subtracting the NoA information reception section CTwindow and the NoA section from the TBTT section.

The NoA setter 206 of the power management unit 102 adjusts the sleep interval of the terminal by comparing the minimum time for the data transmission and the data transmission section.

When the minimum time for the data transmission is greater than the data transmission section, the NoA setter 206 determines that the sleep duration is longer than the data transmission section and processes to extend the data transmission section by reducing the sleep duration of the current NoA.

When the minimum data transmission time is smaller than the data transmission section, the NoA setter 206 determines that the sleep duration is short enough to transmit the data over the preset data transmission section and processes to reduce the power by extending the sleep section of the current NoA or to maintain the sleep section of the current NoA.

Since the operations of the power management unit 102 may be executed by the particular software module (the instruction set) stored in the memory unit 104 as stated above, the operations of the time calculator 202, the transmission section calculator 204, and the NoA setter 206 may be conducted by the software module.

Figure 3:
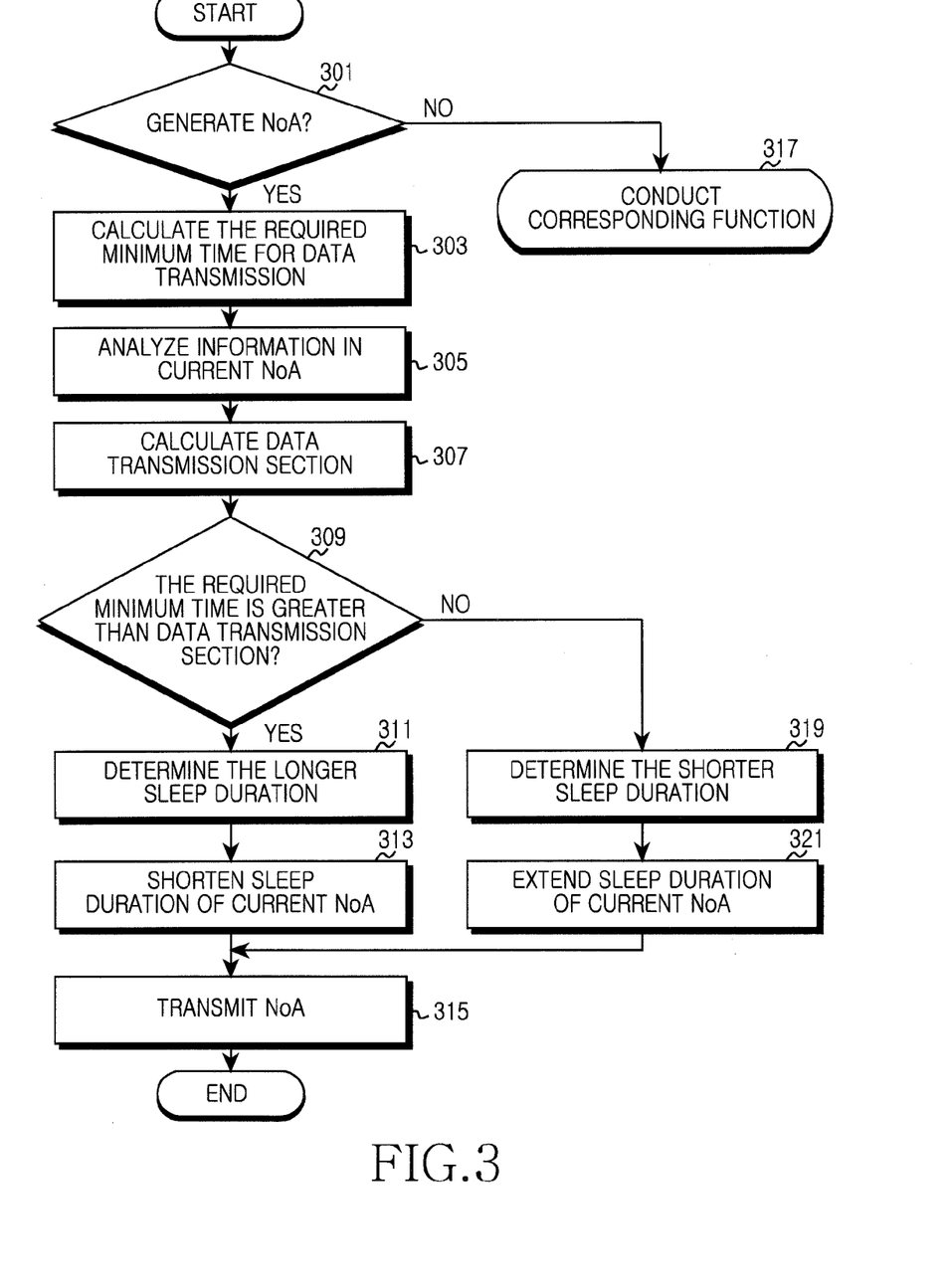
FIG. 3 is a flowchart of operations of the portable terminal according to an exemplary embodiment of the present invention.

FIG. 3 is a flowchart of operations of the portable terminal according to an exemplary embodiment of the present invention.

Referring to FIG. 3, the portable terminal may be equipped with a Wi-Fi Peer-to-Peer (P2P) function and to serve as a P2P group owner which is an Access Point (AP). The portable terminal may also be operating in the power save mode based on the NoA.

In step 301, the portable terminal determines whether to generate the NoA. When the portable terminal does not generate the NoA in step 301, the portable terminal performs the corresponding function (e.g., a standby mode) in step 317.

When the portable terminal does generate the NoA in step 301, the portable terminal calculates the minimum time for the data transmission in step 303. The portable terminal measures the data transmission rate ui to the client (the transmission rate of the uplink packet) and the packet reception rate bi (the reception rate of the downlink packet).

The portable terminal predicts the average transmission speed Ri of the client during the certain time based on the data transmission speed of the client. The data transmission rate, the data reception rate, and the average transmission speed are used to calculate the minimum time for the data transmission to the client. The minimum time Tw for the data transmission may be given by Equation 1.

$$T_W = \sum_{i=1}^{N} (u_i + b_i) W / R_i \quad (1)$$

i denotes an order of the client, $u_i$ denotes the data transmission rate to the client (the transmission rate of the uplink packet), and $b_i$ denotes the packet reception rate from the client (the reception rate of the downlink packet). $R_i$ denotes the transmission speed for the client during the certain time, the certain time W denotes C-ary TBTT sections, and W=(C*TBTT). The portable terminal measures the minimum time for the data transmission of the first through N-th clients.

The portable terminal analyzes the information of the current NoA in step 305 and identifies its data transmission section in step 307. The information in the NoA includes the NoA start time, the sleep duration, the sleep counter, and the interval. The portable terminal may identify the data transmission section using the sleep duration of the NoA information. The TBTT section includes the NoA section, the data transmission section, and the NoA information reception section CTwindow. The client receives the NoA information in the NoA information reception section, enters the sleep mode in the NoA section, and wakes up to transmit and receive data in the data transmission section.

Accordingly, the portable terminal may calculate the data transmission section by subtracting the NoA information reception section CTwindow and the NoA section from the TBTT section.

In step 309, the portable terminal determines whether the minimum time is greater than the data transmission section. The portable terminal determines whether to flexibly change the preset sleep duration according to the data transmission time. The minimum time greater than the data transmission section indicates that the sleep section is greater than the data transmission amount.

When the minimum time is greater than the data transmission section in step 309, the portable terminal determines that the sleep duration is longer than the data transmission section in step 311. In step 313, the portable terminal processes to extend the data transmission section by reducing the sleep duration of the current NoA.

By contrast, when the minimum time is smaller than the data transmission section in step 309, the portable terminal determines that the sleep duration is short enough to transmit the data over the preset data transmission section in step 319.

In step 321, the portable terminal processes to reduce the power consumption by extending the sleep duration of the current NoA. When the minimum time is smaller than the data transmission section in step 309, the portable terminal may process to maintain the sleep duration of the current NoA.

To adjust the sleep duration, the portable terminal determines a maximum NoA duration for sleeping in the TBTT section. The minimum time for the data transmission should be equal to or smaller than the data transmission section of the TBTT as expressed as Equation 2.

$$T_W \leq W - C(CTwindow + NoA)$$

$$\text{where } C \cdot TBTT = W \tag{2}$$

The minimum time $T_W$ for the data transmission may be calculated based on Equation 1. The certain time W denotes C-ary TBTT sections. CTwindow denotes the NoA information reception section, and NoA denotes the sleep section without data transmission and reception.

Data may be transmitted during the corresponding time when the minimum time for the data transmission is smaller than the data transmission section excluding CTwindow and NoA in the C-ary TBTT sections.

Using Equation 1 and Equation 2, the range of the NoA section is given by Equation 3.

$$NoA \leq TBTT \cdot \left(1 - \sum_{i=1}^{N}(u_i + b_i)/R_i\right) - CTwindow \tag{3}$$

i denotes the order of the client, ui denotes the data transmission rate of the client (the transmission rate of the uplink packet), and bi denotes the packet reception rate of the client (the reception rate of the downlink packet). $R_i$ denotes the transmission speed for the client over the certain time W, TBTT denotes the beacon transmission section, and CTwindow denotes the NoA information reception section.

The portable terminal may process to increase the data transmission amount by expanding the data transmission section by adjusting the NoA within the range of Equation 3. The portable terminal may alternatively process to decrease the data transmission section by adjusting the NoA within the range of Equation 3 and to reduce the battery consumption by expanding the sleep section.

While Equation 3 defines the NoA range using the packet transmission and reception rates and the packet transmission speed for each individual client of the group, the portable terminal may set the NoA range using the average packet transmission and reception rates and packet transmission speed of all of the clients of the group.

In so doing, the portable terminal may adjust the NoA within the range of Equation 4.

$$NoA \leq TBTT \cdot (1 - (\bar{u}_i + \bar{b}_i)/\bar{R}_i) - CTwindow \tag{4}$$

ui denotes the data transmission rate of the client (the transmission rate of the uplink packet), and bi denotes the packet reception rate of the client (the reception rate of the downlink packet). $R_i$ denotes the transmission speed for the client over the certain time W, TBTT denotes the beacon transmission section, and CTwindow denotes the NoA information reception section. The bar—above each element denotes the average value of the element.

The portable terminal may adjust the NoA duration using the data average transmission rate of the client (the transmission rate of the uplink packet), the average packet reception rate to the client (the reception rate of the downlink packet), and the average transmission speed for the client over the certain time W.

In step 315, the portable terminal processes to transmit the NoA information including the adjusted sleep duration information to the client.

Figure 4A:
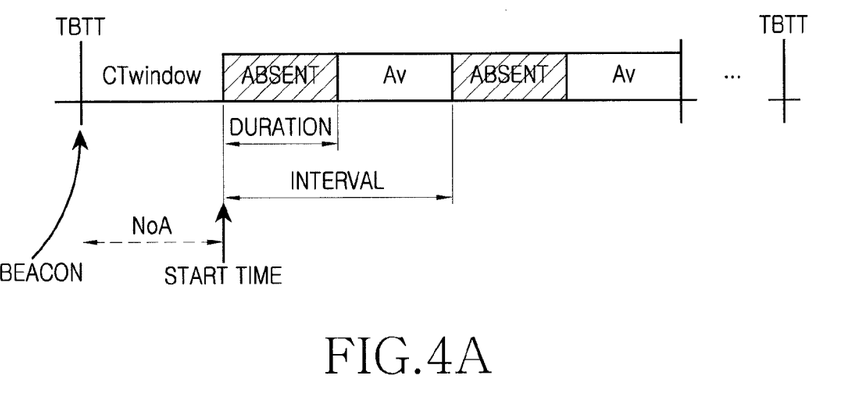
FIGS. 4A, 4B, and 4C are diagrams of NoA information change according to an exemplary embodiment of the present invention.
Figure 4B:
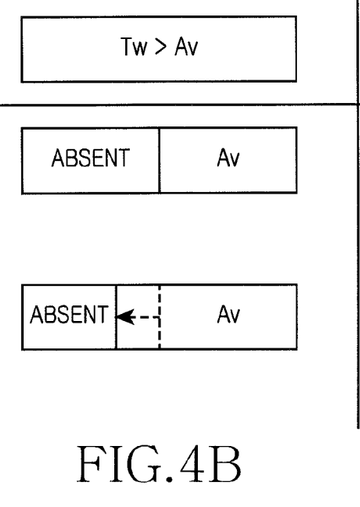
Figure 4C:
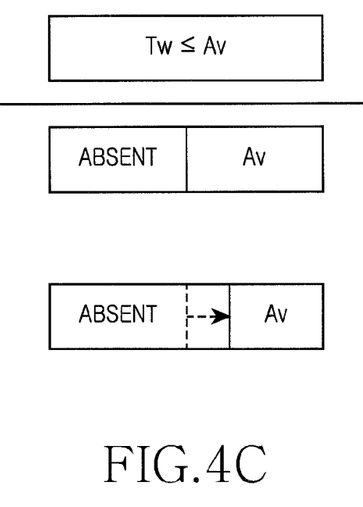

FIGS. 4A-4C depict NoA information change according to an exemplary embodiment of the present invention.

Referring to FIGS. 4A-4C, the TBTT section of FIG. 4A includes the NoA section, the data transmission section, and the NoA information reception section CTwindow. The client receives the NoA information in the NoA information reception section, enters the sleep mode in the NoA section, and wakes up to transmit and receive data in the data transmission section. In the NoA section, the portable terminal sleeps to save the power.

When the time needed to transmit the data in the TBTT section is 70 ms, the data transmission section over 70 ms may accomplish efficient data transmission.

When the time needed to transmit the data in the TBTT section is 70 ms but the data transmission section is 60 ms, the portable terminal has to transmit the data over 60 ms in the current TBTT section and to transmit the data over 10 ms in the data transmission section of the next TBTT.

As such, the portable terminal processes to adjust the data transmission section in accordance with the data transmission time for the sake of the efficient data transmission.

For example, when the minimum time Tw for the data transmission is greater than the data transmission section Av as shown in FIG. 4B, the portable terminal determines that the sleep duration is longer than the data transmission section. Accordingly, the portable terminal processes to extend the data transmission section by reducing the sleep duration of the current NoA.

When the minimum time for the data transmission is smaller than the data transmission section as shown in FIG. 4C, the portable terminal determines that the sleep duration is shorter than the data transmission section. The short sleep duration implies the sufficient data transmission. Accordingly, the portable terminal may process to enhance the power saving by extending the sleep duration in the current NoA, or to maintain the sleep duration of the current NoA.

For example, when the TBTT section is 15 ms, the portable terminal may set the NoA information based on the minimum time Tw of the data transmission as shown in Table 1.

TABLE 1

| Minimum time Tw | Number of sleep occurrence (counter) | Sleep interval | Sleep duration |
|---|---|---|---|
| 7 ms | 7 | 2 ms | 1.0 ms |
| 8 ms | 7 | 2 ms | 0.8 ms |
| 9 ms | 7 | 2 ms | 0.7 ms |

When the minimum time is 7 ms, the portable terminal sleeps for 1 ms and transmits data for 1 ms. When the minimum time is 8 ms, the portable terminal sleeps for 0.8 ms and transmits data for 1.2 ms. When the minimum time is 9 ms, the portable terminal sleeps for 0.7 ms and transmits data for 1.3 ms.

While the portable terminal according to the related art sleeps for seven times in the set sleep duration, the portable terminal according to exemplary embodiments of the present invention enters the sleep mode during the sleep duration adjusted based on the minimum time.

The above-described methods may be implemented in hardware or software alone or in combination.

The software may be recorded on a computer-readable storage medium containing one or more programs (software modules). One or more programs stored in the computer-readable storage medium may be configured for execution by one or more processors of an electronic device such as a portable terminal. The programs include instructions causing the electronic device to execute the methods according to the exemplary embodiments of the present invention.

Such programs (software module, software) may be stored in a random access memory, a non-volatile memory including a flash memory, a ROM, an Electrically Erasable Programmable ROM (EEPROM), a magnetic disc storage device, a compact disc ROM, Digital Versatile Discs (DVDs) or other optical storage devices, and a magnetic cassette. Alternatively, the programs may be stored in a memory combining part or all of those recording media. A plurality of memories may be equipped.

The programs may be stored in an attachable storage device of the electronic device accessible via the communication network such as Internet, Intranet, LAN, Wireless LAN (WLAN), or Storage Area Network (SAN), or a communication network alone or in combination. The storage device may access the electronic device through an external port.

A separate storage device in the communication network may access the portable electronic device.

For example, in the electronic device including one or more processors, a memory, and one or more modules stored in the memory and configured in be executed by the one or more processors, the module may include instructions for calculating the minimum time for the transmit data over a certain time, calculating the data transmission section over the certain time, determining whether to change the NoA information by comparing the minimum time and the data transmission section, and adjusting the sleep duration of the NoA information when the NoA information needs to change.

In addition, the module of the electronic device may include instructions for calculating the packet transmission and reception rates for the client and calculating the packet transmission speed for the client.

The module of the electronic device may include an instruction for calculating the data transmission section by subtracting the NoA information reception section CTwindow and the NoA section.

The module of the electronic device may include instructions for determining that the sleep duration is longer than the data transmission section when the minimum time is greater than the data transmission section, and for determining that the sleep duration is shorter than the data transmission section when the minimum time is smaller than the data transmission section.

As set forth above, the sleep duration in the TBTT section is adjusted in the portable terminal. Therefore, the data transmission performance may be enhanced and the power consumption may be reduced.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An apparatus for saving power in a portable terminal, the apparatus comprising:
a communication unit for receiving Notice of Absence (NoA) information for a power saving mode;
a control unit for controlling a client of a group to enter the power saving mode based on the NoA information; and
a power management unit for generating the NoA information for the power saving mode,
wherein the power management unit comprises:
a time calculator for determining a minimum time for data to transmit over a certain time;
a transmission section calculator for determining a data transmission section over the certain time; and
a NoA setter for determining whether to change the NoA information by comparing the minimum time and the data transmission section, and for adjusting a sleep duration of the NoA information when the NoA information needs to change.

2. The apparatus of claim 1, wherein the time calculator calculates a minimum time for the transmit data by calculating packet transmission and reception rates for the client and calculating a packet transmission speed for the client.

3. The apparatus of claim 2, wherein the time calculator calculates the minimum time for the transmit data based on the following equation:

$$T_W = \sum_{i=1}^{N} (u_i + b_i) W / R_i$$

wherein i denotes an order of the client, $u_i$ denotes a data transmission rate for the client (an uplink packet transmission rate), $b_i$ denotes a packet reception rate for the client (a reception rate of a downlink packet), $R_i$ denotes a transmission speed for the client during the certain time, the certain time W indicates C-ary Target Beacon Transmission Time (TBTT) sections, and W=(C*TBTT).

4. The apparatus of claim 1, wherein the transmission section calculator calculates the data transmission section by subtracting a NoA information reception section CTwindow and a NoA section.

5. The apparatus of claim 1, wherein, when the minimum time is greater than the data transmission section, the NoA setter determines that a sleep duration is longer than a data transmission section, and when the minimum time is smaller than the data transmission section, the NoA setter determines that the sleep duration is shorter than the data transmission section.

6. The apparatus of claim 1, wherein the NoA setter adjusts a sleep interval of the NoA information according to a comparison result of the minimum time and the data transmission section, and
wherein the sleep duration is adjusted within a range based on the following equation:

$$NoA \leq TBTT \cdot \left(1 - \sum_{i=1}^{N}(u_i + b_i)/R_i\right) - CTwindow$$

wherein i denotes an order of the client, $u_i$ denotes a data transmission rate for the client (an uplink packet transmission rate), $b_i$ denotes a packet reception rate for the client (a reception rate of a downlink packet), $R_i$ denotes a transmission speed for the client during the certain time W, TBTT denotes a beacon transmission section, and CTwindow denotes the NoA information reception section.

7. The apparatus of claim 1, wherein the NoA setter adjusts a sleep interval of the NoA information according to a comparison result of the minimum time and the data transmission section, and
wherein the sleep duration is adjusted within a range based on the following equation:

NoA≤TBTT·(1−($\bar{u}_i$+$\bar{b}_i$)/$\bar{R}_i$)−CTwindow wherein $u_i$ denotes a data transmission rate for the client (an uplink packet transmission rate), $b_i$ denotes a packet reception rate for the client (a reception rate of a downlink packet), R denotes a transmission speed for the client during the certain time W, TBTT denotes a beacon transmission section, CTwindow denotes the NoA information reception section, and a bar—above each element denotes an average value of the element.

8. A method for saving power in a portable terminal, the method comprising:
determining a minimum time for data to transmit over a certain time;
determining a data transmission section over the certain time;
determining whether to change Notice of Absence (NoA) information by comparing the minimum time and the data transmission section; and
when the NoA information needs to change, adjusting a sleep duration of the NoA information.

9. The method of claim 8, wherein the calculating of the minimum time for the transmit data comprises:
calculating packet transmission and reception rates for the client; and
calculating a packet transmission speed for the client.

10. The method of claim 9, wherein the calculating of the minimum time for the transmit data is conducted based on the following equation:

$$T_W = \sum_{i=1}^{N}(u_i + b_i)W/R_i$$

wherein i denotes an order of the client, $u_i$ denotes a data transmission rate for the client (an uplink packet transmission rate), $b_i$ denotes a packet reception rate for the client (a reception rate of a downlink packet), $R_i$ denotes a transmission speed for the client during the certain time W, the certain time W indicates C-ary Target Beacon Transmission Time (TBTT) sections, and W=(C*TBTT).

11. The method of claim 8, wherein the calculating of the data transmission section comprises calculating the data transmission section by subtracting a NoA information reception section CTwindow and a NoA section.

12. The method of claim 8, wherein the determining of whether to change the NoA information by comparing the minimum time and the data transmission section comprises:
when the minimum time is greater than the data transmission section, determining that a sleep duration is longer than a data transmission section; and
when the minimum time is smaller than the data transmission section, determining that the sleep duration is shorter than the data transmission section.

13. The method of claim 8, wherein the adjusting of the sleep duration of the NoA information comprises adjusting a sleep interval of the NoA information according to a comparison result of the minimum time and the data transmission section, and
wherein the sleep duration is adjusted within a range based on the following equation:

$$NoA \leq TBTT \cdot \left(1 - \sum_{i=1}^{N}(u_i + b_i)/R_i\right) - CTwindow$$

wherein i denotes an order of the client, $u_i$ denotes a data transmission rate for the client (an uplink packet transmission rate), $b_i$ denotes a packet reception rate for the client (a reception rate of a downlink packet), $R_i$ denotes a transmission speed for the client during the certain time W, TBTT denotes a beacon transmission section, and CTwindow denotes the NoA information reception section.

14. The method of claim 8, wherein the adjusting of the sleep duration of the NoA information comprises adjusting a sleep interval of the NoA information according to a comparison result of the minimum time and the data transmission section, and
wherein the sleep duration is adjusted within a range based on the following equation:

NoA≤TBTT·(1−($\bar{u}_i$+$\bar{b}_i$)/$\bar{R}_i$)−CTwindow wherein $u_i$ denotes a data transmission rate for the client (an uplink packet transmission rate), $b_i$ denotes a packet reception rate for the client (a reception rate of a downlink packet), $R_i$ denotes a transmission speed for the client during the certain time W, TBTT denotes a beacon transmission section, CTwindow denotes the NoA information reception section, and a bar—bove each element denotes an average value of the element.

15. An electronic device, the device comprising:
one or more processors;
a memory; and at least one module stored in the memory and configured to be executed by the one or more processors, wherein the at least one module calculates a minimum time for data to transmit over a certain time, determines a data transmission section over the certain time, determines whether to change Notice of Absence (NoA) information by comparing the minimum time and the data transmission section, and adjusts a sleep duration of the NoA information when the NoA information needs to change.

16. The device of claim 15, wherein the at least one module calculates packet transmission and reception rates for a client and calculates a packet transmission speed for the client.

17. The device of claim 15, wherein the at least one module calculates the data transmission section by subtracting a NoA information reception section CTwindow and a NoA section.

18. The device of claim 15, wherein, when the minimum time is greater than the data transmission section, the at least one module determines that a sleep duration is longer than a data transmission section, and when the minimum time is smaller than the data transmission section, the at least one module determines that the sleep duration is shorter than the data transmission section.

19. The device of claim 15, wherein the at least one module adjusts a sleep interval of the NoA information according to a comparison result of the minimum time and the data transmission section, and wherein the sleep duration is adjusted within a range based on the following equation:

$$NoA \leq TBTT \cdot \left(1 - \sum_{i=1}^{N}(u_i + b_i)/R_i\right) - CTwindow$$

wherein i denotes an order of the client, $u_i$ denotes a data transmission rate for the client (an uplink packet transmission rate), $b_i$ denotes a packet reception rate for the client (a reception rate of a downlink packet), $R_i$ denotes a transmission speed for the client during the certain time W, TBTT denotes a beacon transmission section, and CTwindow denotes the NoA information reception section.

20. The device of claim 15, wherein the at least one module adjusts a sleep interval of the NoA information according to a comparison result of the minimum time and the data transmission section, and wherein the sleep duration is adjusted within a range based on the following equation:

$$NoA \leq TBTT \cdot (1 - (\bar{u}_i + \bar{b}_i)/\bar{R}_i) - CTwindow$$

wherein $u_i$ denotes a data transmission rate for the client (an uplink packet transmission rate), $b_i$ denotes a packet reception rate for the client (a reception rate of a downlink packet), $R_i$ denotes a transmission speed for the client during the certain time W, TBTT denotes a beacon transmission section, CTwindow denotes the NoA information reception section, and a bar—above each element denotes an average value of the element.

* * * * *